Oct. 7, 1952  B. E. DEL MAR  2,612,828
CABIN PRESSURE CONTROL INSTRUMENT
Filed Dec. 9, 1950  2 SHEETS—SHEET 1

INVENTOR.
BRUCE E. DEL MAR
BY J. Edwin Coates
ATTORNEY

Patented Oct. 7, 1952

2,612,828

UNITED STATES PATENT OFFICE 2,612,828

CABIN PRESSURE CONTROL INSTRUMENT

Bruce E. Del Mar, Los Angeles, Calif., assignor to Douglas Aircraft Company, Inc., Santa Monica, Calif.

Application December 9, 1950, Serial No. 200,045

17 Claims. (Cl. 98—1.5)

1

This invention relates to pressure responsive instruments and more particularly to such instruments especially useful in systems for controlling pressure of the air of aircraft cabins.

This application is a continuation-in-part of my co-pending applications Serial No. 443,233, now Patent No. 2,549,672, and Serial No. 669,366, now Patent No. 2,549,673, filed May 16, 1942 and May 13, 1946 respectively. In the pressure controlling systems therein shown, as in all such systems, the absolute pressure of cabin air is varied by controllably varying the rate of air discharge from the cabin relative to the rate of the air delivery to the cabin. The air delivered to the cabin is furnished by superchargers or like blowers which are capable of delivering air to the cabin at pressures greater than flight or ambient pressure. Such blowers will operate efficiently so long as the ratio of the outlet pressure to inlet pressure does not exceed the design limit of the blower. This ratio is commonly termed the compression ratio of the blower and is one which can be readily determined.

As the aircraft ascends the ratio of cabin absolute pressure to flight absolute pressure will, of course, increase if a comfortable pressure schedule is maintained for the cabin. This ratio of pressures actually very closely approximates the ratio of outlet pressure to inlet pressure of the air delivery means as ambient air at ambient pressure is drawn into the air delivery means and forced into the cabin under a pressure higher than cabin air pressure. Once the ratio of cabin absolute pressure to flight absolute pressure exceeds the compression ratio of the air delivery means, the latter fail to furnish air to the cabin at controllable or known pressures. The resultant pressure surgings or pulsations obviously will produce rapid changes in the cabin absolute pressure and render control of cabin absolute pressure along a desired schedule substantially impossible. The compression ratio of the air delivery means of any pressurizable cabin aircraft, therefore, imposes a limit on the altitude to which the aircraft can be flown.

The instrument of the present invention in the broadest aspects thereof comprises means, operable in accordance with a selected ratio of cabin absolute pressure to flight absolute pressure, adapted to cooperate with the means of the system for varying the rate of air discharge from the cabin relative to the rate of air delivery to the cabin to maintain such ratio substantially constant above an altitude at which cabin absolute pressure would tend to exceed the value

2 necessary to provide the pre-selected ratio. The instrument of the present invention thus insures that the superchargers or blowers will not be forced even at extremely high altitude flight to operate against a compression ratio beyond the range in which the superchargers or blowers will give satisfactory service. This makes it possible to maintain the supercharger system in operation throughout the entire altitude range in which the aircraft is capable of flight without limitation by characteristics of the air supply equipment used.

The instrument of the present invention can be used in any control system for regulating the absolute pressure within the cabin and will act to hold the ratio of cabin absolute pressure to flight absolute pressure to a preselected value regardless of the pressure schedule of the cabin prior to the time the ratio of cabin absolute pressure to flight absolute pressure equaled the preselected ratio. The pressure responsive means sensing the ratio of cabin absolute pressure to flight absolute pressure can also be used to effect other control actions to bring about a desired pressure schedule for the cabin at altitudes lower than the altitude at which the desired ratio control is made effective.

Other features and advantages of the present invention will be hereinafter apparent from the following description, particularly when taken in connection with the accompanying drawing in which.

Figure 1:
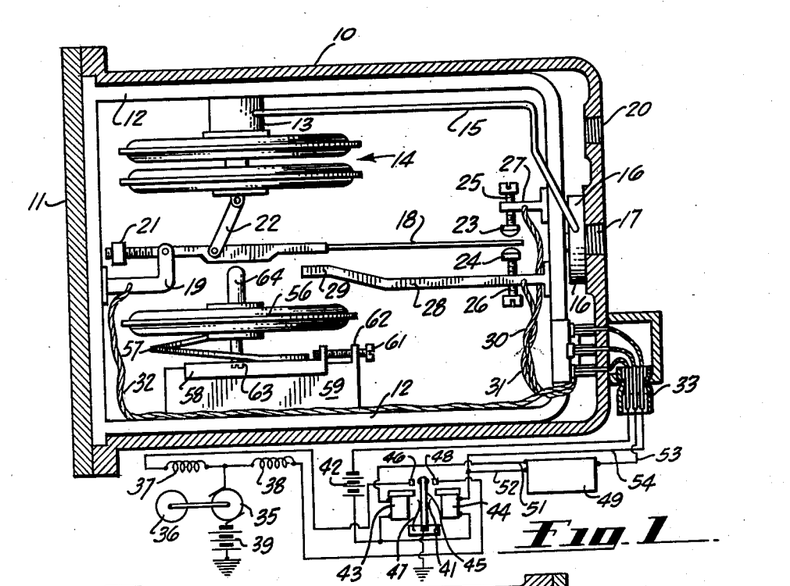
Figure 1 is a view partly in section and partly in elevation of one embodiment of the instrument of the present invention together with a diagrammatic showing of one control system with which the instrument can be used.

The embodiment of the instrument of the present invention illustrated in Figure 1 comprises a case 10 of insulating material having the open end shown sealed by a wall element 11. The one wall of the case 10 is formed with a tapped aperture 20 for receiving one end of a tube or conduit communicating the interior of the case 10 with the interior of the cabin in which the instrument is mounted. The case 10 houses a suitable frame 12 on which is mounted a hollow spool 13, the frame being insertable through the opening in the case sealed by the wall element 11. A differential pressure capsule assembly 14 is rigidly secured to the one end of the spool 13 and the interior of the latter directly communicates with the interior of the capsule assembly. A tube 15 communicates the interior of the spool 13 with the interior of a hollow fitting 16 fixed to the one wall of the case 10. An opening 17 formed in this wall of the case is adapted to receive the one end of a conduit or tube led to the exterior of the aircraft to the end that the interior of the fitting 16 is exposed to ambient flight pressure. This pressure is thus communicated through the tube 15 to the interior of the differential pressure assembly 14. As the interior of the case 10 is subjected to the absolute pressure within the cabin, it will be seen that the capsule assembly 14 will respond to changes in cabin differential pressure.

A control arm 18 is pivotally mounted adjacent one end thereof to an L-shaped support 19 fixed to the frame 12. To counter balance the arm 18, a weight 21 is threadedly mounted to the one end of the arm for movement longitudinally of the same. The control arm 18 and the capsule assembly 14 are pivotally interconnected through a short link 22, the opposite ends of which are connected respectively to the movable end of the capsule assembly 14 and the control arm 18 through suitable pivot pins.

The angular position of control arm 18 is thus varied by expansion or contraction of the capsule assembly 14 to move the free end of the arm 18 between a pair of contacts 23 and 24 carried by threaded rods 25 and 26 respectively. The rods 25 and 26 are threadedly mounted in tapped openings formed in fingers 27 and 28 respectively, suitably supported on the frame 12 and insulated therefrom. It will thus be seen that the contacts 23 and 24 can be adjusted relative to each other by rotation of the rods 25 and 26. A bumper 29 formed by an extension of the finger 28 limits the angular deflection of the control rod 18.

Conductors 30, 31 and 32 lead from the contacts 23, 24 and the control arm 18 respectively, to a suitable lead in receptacle 33 which takes an attachment cap, not shown, carrying contacts connected to control circuits of the cabin pressurization system. To illustrate the operation of the instrument now being described, there is illustrated in Figure 1 a schematic showing of a control circuit with which the instrument can be used. In this system, a motor 35 through a suitable gear train, not shown, operates a valve 36 used to control the rate of air discharged from the cabin. The motor 35 is reversible and may be energized either through the field coil 37 or 38 by power from some suitable source such as the battery 39, to move the valve in alternate directions, depending upon the direction of rotation of the motor 35.

Automatic control of the valve 36 is effected through a control relay 41 which, as shown for illustrative purposes, is essentially a power amplifier in which very small currents from a battery 42 can be used to selectively energize the coils 43 and 44 of the relay 41 to control a flow of relatively large currents in the circuits of the motor field coils 37 and 38. Energization of relay coil 43 causes the armature 45 of the relay to move to the left, as viewed in Figure 1, and into engagement with a contact 46 against the action of one of a pair of centering springs 47 to complete a circuit from the battery 39 through the circuit of the field coil 37. Energization of this field coil produces such rotation of the motor to drive the valve 36 toward a closing position to decrease the rate of air discharge from the cabin. Energization of relay coil 44 causes the armature 45 of the relay to move to the right, as viewed in Figure 1, to engage with contact 48 against the action of the other of the pair of centering springs 47 to complete a circuit from the battery 39 through the circuit of the field coil 38. The completion of this circuit, as should now be understood, causes the motor to drive the valve 36 in the opposite direction, that is, towards an open position to increase the rate of air discharge from the cabin.

Energization of the relay 41 is in part controlled by pressure responsive means schematically shown at 49. The control means schematically shown at 49 may comprise any control elements desired which will regulate cabin pressure along some preselected or desired pressure schedule as the aircraft is flown at altitudes at which pressurization is desired.

Figure 4:
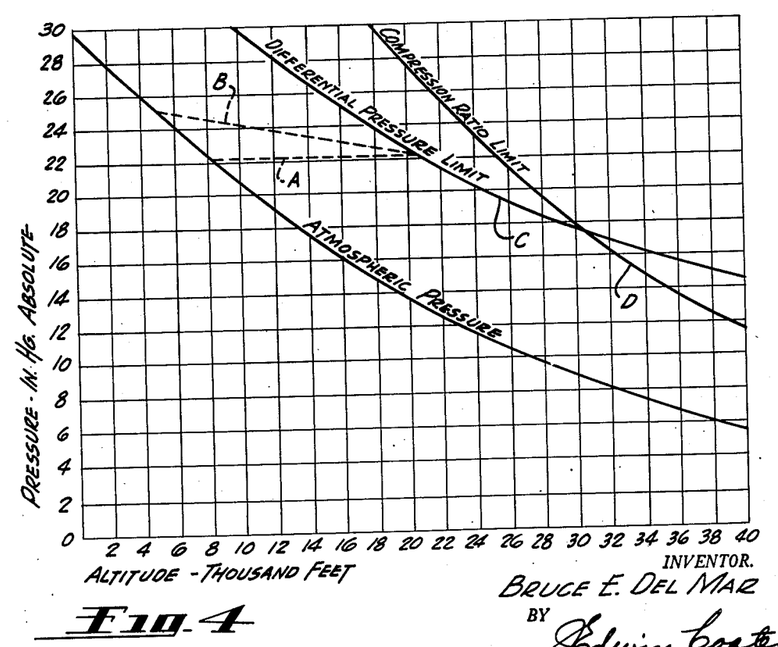
Figure 4 is a graphic plot of the pertinent pressure control relations between cabin pressure and flight altitude for explanation of the present invention.

Figure 4 illustrates in graph form, in which flight altitude is plotted against pressure, alternate forms of pressure schedules possible with the control means 49. In one schedule represented by broken line A, the control means 49 acts to hold the cabin absolute pressure substantially constant after the aircraft has reached an altitude of 8000 feet, cabin absolute pressure remaining constant until the aircraft has ascended to an altitude, in the illustration now being explained, of approximately 21,000 feet. At this altitude the differential between cabin absolute pressure and flight absolute pressure will have equalled the predetermined differential pressure set by the bursting strength of the cabin. In the schedule represented by broken line B control means 49 has progressively decreased cabin absolute pressure as the aircraft ascended beyond 5000 feet altitude until the differential pressure limit was reached.

As the control means 49 is electrically connected by leads 51 and 52 to the relay coils 43 and 44 respectively, it will act through suitable switch means to energize one or the other of the coils depending upon the pressure values affecting the control means 49. The control means 49 is also connected by a lead 53 to the conductor 31 of the instrument now being described, which as previously explained is connected to the contact 24. This lead 53 in effect forms a grounding connection for the control means 49, for the latter is grounded only when the control arm 18 of the instrument is in engagement with the contact 24. It will thus be seen that if the control arm 18 has moved out of engagement with the contact 24, the control means 49 is prevented from effecting any control action on the relay 41. The conductor 30 of the instrument connected to the contact 23 is electrically connected to the coil 44 of the relay 41 by a lead 54 so that movement of the arm into engagement with this contact results in energization of the coil 44. Energization of the coil 44, it will be remembered, results in opening movement of the valve 36.

Control arm 18 is held in engagement with ground circuit 24 as long as the pressure differential acting on the differential pressure capsule assembly 14 is less than the predetermined value fixed by the structural strength of the cabin. Whether the control means 49 is regulating cabin absolute pressure along schedules represented by lines A or B in Figure 4 as soon as differential cabin pressure reaches the limit value, control arm 18 first disengages with contact 24 which, as previously explained, opens the grounding circuit of the control means 49, and upon further increase in differential pressure moves into engagement with contact 23 which results in energization of motor field circuit 38 and therefore opening movement of the control valve 36. The instrument will thereafter effect a control schedule represented by line C of the graph of Figure 4.

The instrument of Figure 1 is arranged furthermore to decrease the limit differential pressure in accordance with a fixed limiting ratio of the absolute pressures existing across the pressure capsule assembly 14. This ratio is a preselected one and is substantially that of the compression ratio of the superchargers or blowers used to furnish air under pressure to the cabin. This limiting ratio function is derived from the action of an evacuated capsule or aneroid 56 on the differential pressure capsule 14. The aneroid capsule 56 is supported by a ring 57 carried by a slide 58 mounted on an enlarged portion 59 of the frame 12. An adjusting screw 61 carried by an upstanding boss 62 formed integral with the enlarged portion 59 of the frame 12 permits the slide 58 and the aneroid 56 to be adjusted longitudinally of the frame 12. A second adjustment screw 63 permits axial adjustment of the fixed side of the aneroid 56 with respect to the slide 58.

A post 64 carried by the expandable side of the aneroid 56 is adapted to engage against the underside of the control arm 18 to augment the action of the differential pressure capsule 14 on the control arm whenever aneroid 56 expands more than a predetermined extent as a result of the reduction of cabin absolute pressure below a predetermined value. By adjustment of screws 61 and 63 the position of the aneroid can be selected which will bring about the desired co-operation between the same and the differential pressure capsule assembly 14 to maintain a balance of the control arm 18 between the contacts 23 and 24 in accordance with a preselected ratio of cabin absolute pressure to flight absolute pressure whenever control means 49 seeks to control operation of the valve 36 which would result in a cabin compression ratio in excess of the preselected value. This control of cabin absolute pressure is represented by the line D in the graph of Figure 4.

It will be seen that as long as the cabin compression ratio remains the pre-selected one, control arm 18 will be disposed between contacts 23 and 24, but should the preselected compression ratio be exceeded, action of the capsules 14 and 56 will move the control arm 18 against contact 23 resulting in energization of motor field coil circuit 38 and opening movement of the valve 36 to reduce the absolute pressure within the cabin and consequently the cabin compression ratio.

Figure 2:
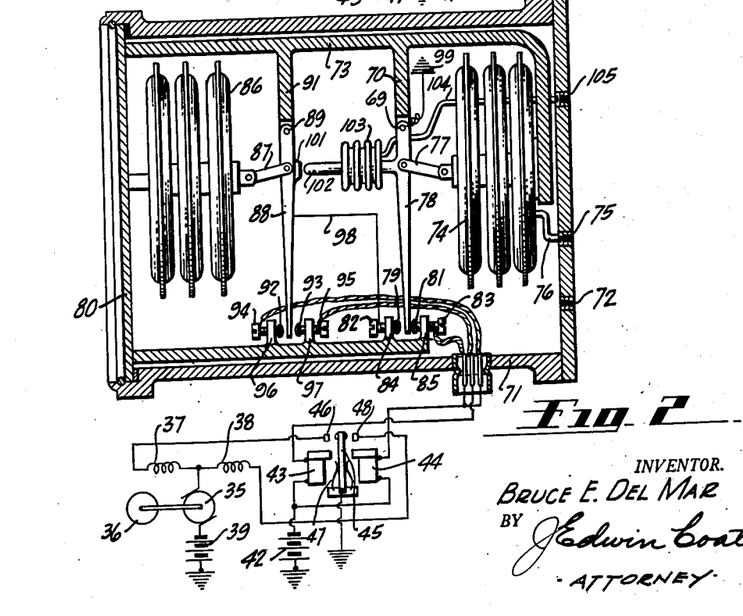
Figure 2 is a view similar to Figure 1, but showing a modified form of the instrument.

There is shown in Figure 2 an instrument in which pressure control members forming a part of the control means 49 in the schematic system shown in connection with the instrument of Figure 1, are actually a part of the instrument. This avoids the necessity of using separate control instruments in the valve control system. The control instrument as shown in Figure 2 comprises a sealed case 71 of insulating material, the one wall of which is formed with a tapped opening 72 for receiving one end of a tube or conduit, not shown, communicating with the interior of the cabin. The case 71 houses a suitable frame 73 to which is mounted a capsule assembly 74. A tapped opening 75 formed in the one wall of the case 71 is adapted to receive one end of a suitable tube or conduit, not shown, but leading to the exterior of the cabin, that is, to flight ambient pressure. A small conduit 76 leads from the tapped opening 75 to the interior of the capsule assembly 74. As the interior of the case 71 is subjected to cabin pressure and as the interior of the capsule assembly 74 is subjected to flight or ambient pressure, it will be seen that the capsule assembly 74 is a differential pressure capsule and will respond to changes in the cabin differential pressure.

A short link 77 pivotally interconnects the movable side of the capsule assembly 74 and a control arm 78 pivotally mounted at 69 to a finger 70 depending from the frame 73. The opposite end of the control arm 78 is movable between contacts 79 and 81 carried by threaded studs 82 and 83 respectively, adjustably carried by fingers 84 and 85 supported on the frame 73 and insulated therefrom.

Mounted to a wall element 80 closing the end of the case 71 at the end opposite to the differential pressure capsule assembly 74 is an evacuated capsule or aneroid 86. The one end of this capsule or aneroid is fixed relative to the frame 73 and the opposite or movable end is pivotally interconnected by means of a short link 87 to a second control arm 88 pivotally mounted at 89 to a finger 91 depending integrally from the frame 73. The opposite end of this control arm moves between contacts 92 and 93 carried by threaded studs 94 and 95 respectively, adjustably carried by bosses 96 and 97 supported on the frame 73 and insulated therefrom. Control arm 88 is electrically connected by a lead 98 to contact 79 engaged by control arm 78 only so long as the cabin differential pressure is below some preselected value determined by the bursting strength of the cabin structure. Control arm 78 is grounded as indicated at 99 so that the aneroid 86 is operable to control cabin absolute pressure as long as contact arm 78 is engaged with the contact 79.

The form of the motor control circuit shown with instrument of Figure 2 is identical to the control circuit shown in Figure 1. It will thus be seen that with control arm 78 engaged with the contact 79, movement of control arm 88 between and into engagement with contacts 92 and 93 will result in such energization of the relay 41 as to close and open the control valve 36 respectively. This is so, for when contact arm 88 is engaged with contact 92 relay coil 44 is energized to result in movement of the armature 45 into engagement with the contact 48 to close a circuit through the motor field coil 38, which, as previously explained, results in such rotational movement of the motor 35 as to drive the valve toward open position. On the other hand, when the aneroid expands because of lessening cabin absolute pressure and the arm 88 is moved to the right and into engagement with the contact 93, a circuit is closed through relay coil 43 which results in movement of the armature 45 to the left and into engagement with contact 46 to energize motor field coil 37. Energization of the coil 37, as should now be understood, results in such rotational operation of the motor 35 as to drive the valve 36 towards closing position.

The aneroid 86 will thus act, after the aircraft has been flown to some preselected altitude, to maintain cabin absolute pressure at a constant value even though the aircraft ascends to altitudes above the apparent altitude of the cabin. Such a cabin pressure schedule is represented by the line A of Figure 4. When the aircraft reaches that altitude at which cabin differential pressure is equal to the preselected differential pressure, the arm 78 will move out of engagement with the contact 79. Disengagement of the arm 78 from the contact 79 disrupts or breaks the grounding circuit established by the lead 98, control arm 78 and ground 99, to render the aneroid inoperative to thereafter control cabin absolute pressure. If the aircraft continues to ascend, the arm 78 will be swung into engagement with the contact 81 as the differential pressure capsule assembly 74 further contracts. Engagement of the control arm 78 with the contact 81 results in energization of the coil 44 of the relay 41 which as previously explained results in movement of the armature 45 into engagement with the contact 48, thereby energizing motor field coil 38 to bring about opening movement of the valve 36.

The differential capsule 74 will thereafter control or regulate pressure within the cabin to maintain a constant differential pressure, represented by line C in Figure 4, until such time as the ratio of cabin absolute pressure to flight absolute pressure equals or exceeds the compression ratio of the supercharger or blowers furnishing air under pressure to the cabin. As the ratio of cabin absolute pressure to flight absolute pressure increases and tends to equal the compression ratio of the air delivery means, aneroid 86 will have expanded to the right to bring the projection 101 of the control arm 88 into direct engagement with the projection 102 carried by the control arm 78 so that any further expansion of the aneroid 86 will transmit pressure through the projection 101 to the control arm 78 to supplement or augment the action of the differential pressure capsule 74 on the control arm 78.

To permit this control action by the aneroid 86, the control arm 88 must be formed of such a material that the arm will flex or yield under the force developed by the expanding aneroid 86. This is so, for at the time the aneroid commences its coaction with the differential pressure capsule, the free end of the control arm 88 will be in engagement with the contact 93. Thus the medial portion of the arm 88 must flex to the right to urge the projection 101 into pressural engagement with the projection 102 carried by the control arm 78. The coaction of the aneroid and differential capsule assemblies will hold the ratio of cabin absolute pressure and flight absolute pressure substantially constant and this pressure schedule is shown by line D of Figure 4.

The interconnection between the aneroid 86 and the control arm 78 embraces a regulation responsive to external temperature variations. This regulation is shown as an expansible fluid filled bellows 103, this bellows being connected by a flexible tube 104 to a port 105 adapted to receive a tube or conduit leading to ambient temperature. Accordingly, as the temperature of the external or ambient air varies, the bellows 103 will expand or contract to bring about the coaction between the aneroid 86 and the control arm 78 at varying altitudes depending upon the ambient air temperature.

In all of the instruments embodying the present invention heretofore described, the control action of the instrument is brought about by a contact arm moving into and out of engagement with contact elements. The present invention is not intended to be limited to such an instrument for actually the present invention in the broadest aspects thereof encompasses all means for effecting a control action through the coaction of pressure responsive capsule assemblies operatively connected to a movable element which is moved by the capsule assemblies in accordance with a selected ratio of cabin absolute pressure to flight absolute pressure.

Figure 3:
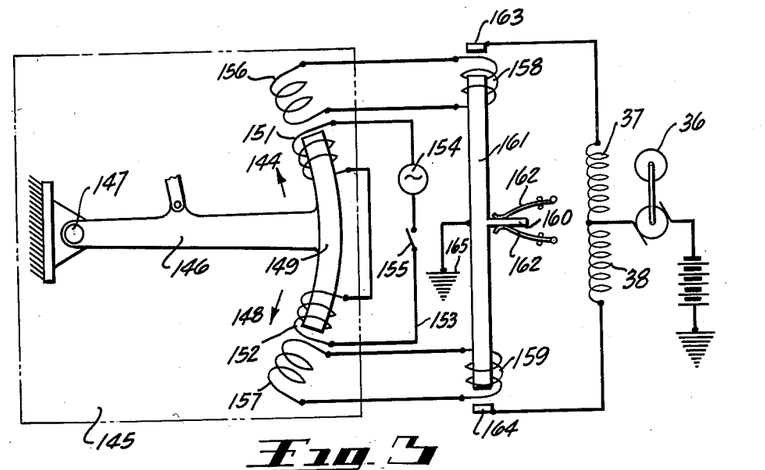
Figure 3 is a schematic showing of another embodiment of the present invention and showing the electrical circuits controlled thereby.

There is shown in Figure 3 an instrument schematically indicated at 145 which includes a control arm 146 pivotally mounted as indicated at 147. The control arm 146 is operatively connected to a plurality of pressure sensitive capsule assemblies, not shown, but which will move the control arm 146 in opposite directions indicated by the arrows 144 and 148 depending upon the relationship of cabin absolute pressure to flight absolute pressure.

The control arm 146 carries at its outer or free end a core element 149 arranged transversely of the arm 146. The opposite end portions of the core element 149 are coaxially disposed within spaced coils 151 and 152 series connected into a circuit 153 which includes a source of alternating current 154 and a manually operable switch 155. Arranged adjacent the coils 151 and 152 are coils 156 and 157 respectively, so formed that the end portions of the core element 149 traverses the turns thereof as the arm 156 is pivotally moved under the urgings of the pressure change responsive capsule assemblies connected to the arm 146. The coil 156 is series connected with a coil 158 while coil 157 is connected with a similar coil 159. The coils 158 and 159 circumscribe the opposite ends of a core element 161 mounted for longitudinal movement but yieldably held by contact of arm 160 with centering springs 162, similar to spring 47 of the previously described control circuit, in a center or neutral position. The normal position of the core element 161 is shown in Figure 3 and in this position the opposite end faces thereof are spaced from fixed contacts 163 and 164 connected respectively to motor field coil circuits 37 and 38.

In the operation of the instrument now being described, if the arm 146 is moved in the direction of the arrow 144, the one end portion of the core element 149 progressively traverses the turns of the coil 156 to induce in that coil and consequently coil 158, an electro-magnetic flux sufficient to draw or attract the core 161 upwardly and into engagement with contact 163. As the core 161 is grounded, as indicated at 165, movement of the end face of the core into engagement with the contact 163 will complete a circuit through the motor field coil 37 which, as previously explained, results in a closing movement of the valve 36.

On the other hand, if the core element 149 moves between the turns of the coil 157, the current induced in that coil and consequently the coil 159, will draw the armature 161 downwardly, as viewed in Figure 3, and into engagement with contact 164. It should now be obvious that engagement of the core 161 with the contact 164 energizes the motor field coil 38 to produce opening movement of the valve 36.

It will now be seen that each illustrated embodiment of the present invention is one which is operable in accordance with a selected ratio of cabin absolute pressure to flight absolute pressure and adapted to cooperate with the valve operating means of a pressure control system to so operate said valve as to maintain such ratio substantially constant at all altitudes above some datum altitude. It will be seen that the control arm of each embodiment of the invention herein illustrated forms actuator means which, in cooperation with the contacts or coils of the instrument, form selecting means for bringing about the necessary change in cabin absolute pressure to maintain the desired ratio of pressures substantially constant. The control arm or lever together with the contacts or coils thus form control effecting means adapted to be operatively connected to the valve operating means of a system such as illustrated in the drawing.

Although all embodiments of the present invention have been herein shown and described as instruments controlling electrical systems, it should be obvious that other types of motivating systems could be used such as hydraulic or pneumatic, as the particular type of system is not important to the invention herein disclosed.

Although the now preferred embodiments of the present invention have been illustrated and disclosed herein, it is to be understood that the invention is not to be limited thereto for the same is susceptible to changes in form and detail within the scope of the appended claims.

I claim:

1. An instrument for use in a system for regulating pressure in an aircraft cabin which system includes means to effect and control air outflow from the cabin, comprising: a housing to be mounted within said cabin and including means for communicating the interior of said housing with the interior of said cabin; a first capsule mounted within said housing; means carried by said housing adapted to be connected to flight absolute pressure and communicating with the interior of said first capsule whereby the latter is to be subject to, and movable in response to changes in, the difference between cabin absolute pressure and flight absolute pressure; control effecting means including means adapted to be operatively connected to the means of said system for effecting and controlling outflow of air from the cabin; means operatively connecting said first capsule to said control effecting means whereby the latter is motivated by pressure change responsive movements of said capsule; an evacuated capsule mounted within said housing, exteriorly subject to cabin absolute pressure, and movable in response to changes in cabin absolute pressure; said capsules being so mounted within said housing as to be in mechanical force transmitting relationship with each other and so arranged that expansion of said evacuated capsule forcibly opposes expansion of said first capsule as said evacuated capsule expands in response to decreasing cabin absolute pressure during ascent of said aircraft; said evacuated capsule acting, whenever the ratio of cabin absolute pressure to flight absolute pressure exceeds a preselected value, to progressively restrain the expansion of said first capsule to produce such motivation of said control effecting means that the latter is adapted to control operation of said outflow effecting and controlling means of said system to vary cabin absolute pressure in accordance with said preselected ratio of cabin absolute pressure to flight absolute pressure.

2. An instrument for controllably regulating pressure within an aircraft cabin whereinto air is continuously supplied by an air delivery means and having means for varying the rate of air discharged therefrom, comprising: a pivotally mounted lever; a pressure responsive device adapted to be subjected to, and movable in response to changes in, the difference between cabin absolute pressure and flight absolute pressure; means interconnecting said lever and said device whereby said lever is moved by said device as it moves in response to changes in the difference between said pressures; a second pressure responsive device adapted to be mounted within the cabin and subjected to, and movable in response to changes in, cabin absolute pressure; and means carried by said second pressure responsive device cooperatively associated with the lever and arranged solidly to engage said lever to forcibly resist movement of said lever because of expansion of said first device as said second device expands in response to decreasing cabin absolute pressure during operation of the aircraft within an altitude range in which the ratio of cabin absolute pressure to flight absolute pressure exceeds a predetermined value.

3. An instrument for use in a system for regulating pressure in an aircraft cabin which system includes means to effect and control air outflow from the cabin, comprising: a housing to be mounted within said cabin and including means for communicating the interior of said housing with the interior of said cabin; a first capsule mounted within said housing; means carried by said housing adapted to be connected to flight absolute pressure and communicating with the interior of said first capsule whereby the latter is to be subject to, and movable in response to changes in, the difference between housing pressure and flight absolute pressure; a second capsule mounted within said housing, exteriorly subjected to housing pressure, and movable in response to changes in housing pressure; said capsules being so arranged that expansion of said second capsule will forcibly oppose expansion of said first capsule to modify the pressure change responsive movements of said first capsule to produce a resultant movement as said capsules conjointly move in response to changes in housing and flight absolute pressures; a control effecting means including means adapted to be operatively connected to the means of the system effecting and controlling outflow of air from the cabin; and means motivating said control effecting means through the resultant movement of said capsules as the same conjointly move in response to changes in housing and flight absolute pressures.

4. An instrument for use in a system for regulating pressure in an aircraft cabin which system includes means to effect and control air outflow from the cabin, comprising: a housing to be mounted within said cabin and including means for communicating the interior of said housing with the interior of said cabin; a first capsule mounted within said housing; means carried by said housing adapted to be connected to flight absolute pressure and communicating with the interior of said first capsule whereby the latter is to be subject to, and movable in response to changes in, the difference between cabin absolute pressure and flight absolute pressure; control effecting means; means movably mounting said control effecting means within said housing; said control effecting means including means adapted to be operatively connected to the means of said system for effecting and controlling outflow of air from the cabin; means operatively connecting said first capsule to said control effecting means whereby the latter is moved by pressure change responsive movement of said capsule; an evacuated capsule mounted within said housing; exteriorly subjected to cabin absolute pressure, and movable in response to changes in cabin absolute pressure; said capsules being so mounted within said housing as to be in mechanical force transmitting relationship with each other and so arranged that expansion of said evacuated capsule forcibly opposes expansion of said first capsule as said evacuated capsule expands in response to decreasing cabin absolute pressure during ascent of said aircraft; said evacuated capsule acting, whenever the ratio of cabin absolute pressure to flight absolute pressure exceeds a preselected value, to progressively restrain the expansion of said first capsule to produce such movement of said control effecting means that the latter is adapted to control operation of said outflow effecting and controlling means of said system to vary cabin absolute pressure in accordance with said preselected ratio of cabin absolute pressure to flight absolute pressure.

5. An instrument for controllably regulating pressure within an aircraft cabin whereinto air is continuously supplied by an air delivery means and having means for varying the rate of air discharge therefrom, comprising: two pressure sensitive means, the first of said pressure sensitive means adapted to be responsive to changes in cabin absolute pressure; and the second being adapted to be responsive to the difference between cabin absolute pressure and flight absolute pressure; control effecting means adapted to be operatively connected to said varying means, said means including means moved by said second pressure sensitive means in response to changes in the difference between cabin absolute pressure and flight absolute pressure to regulate said varying means to effect a control of cabin absolute pressure to maintain the difference between said pressures substantially constant; and means carried by said first pressure sensitive means and movable thereby into engagement with said movable means at a preselected cabin absolute pressure to resist increase of cabin absolute pressure movement of said movable means whenever said second pressure sensitive means thereafter responds to a decrease in the difference between cabin absolute pressure and flight absolute pressure to maintain cabin absolute pressure in accordance with a predetermined ratio of cabin absolute pressure to flight absolute pressure.

6. An instrument for use in a system for regulating pressure in an aircraft cabin which system includes means to effect and control air outflow from the cabin, comprising: a housing to be mounted within said cabin and including means for communicating the interior of said housing with the interior of said cabin; a first capsule mounted within said housing; means carried by said housing adapted to be connected to flight absolute pressure and communicating with the interior of said first capsule whereby the latter is to be subject to, and movable in response to changes in the difference between cabin absolute pressure and flight absolute pressure; control effecting means adapted to be connected to the airflow control means of said system, said control effecting means being operatively connected to said first capsule and motivated by pressure change responsive movements of said capsule to produce operation of said outflow controlling means in a manner which will maintain cabin differential pressure at a preselected constant value throughout a medium altitude range; a second capsule mounted within said housing subject to, and movable in response to changes in cabin absolute pressure; said first and second capsules being so arranged that a preselected expansion of said second capsule will forcibly oppose expansion of said first capsule; means carried by said second capsule and movable therewith as said second capsule expands in response to decreasing cabin absolute pressure as said aircraft ascends beyond said medium altitude range; said last named means, upon attainment by the aircraft of an altitude where the ratio of cabin absolute pressure to flight absolute pressure equals a preselected value, being operative to establish mechanical force-transmitting relationship between said capsules, and co-acting with said second capsule to so modify the pressure change responsive movements of said first capsule as said aircraft ascends beyond said altitude as to thereafter, throughout a higher altitude range, produce such motivation of said control effecting means that the latter is adapted to control operation of said outflow controlling means to vary cabin absolute pressure in accordance with said preselected ratio of cabin absolute pressure to flight absolute pressure.

7. An instrument for use in a system for regulating pressure in an aircraft cabin which system includes means to effect and control air outflow from the cabin, comprising: a housing to be mounted within said cabin and including means for communicating the interior of said housing with the interior of said cabin; a first capsule mounted within said housing subject to, and movable in response to changes in cabin absolute pressure; a second capsule mounted within said housing; means carried by said housing adapted to be connected to flight absolute pressure and communicating with the interior of said second capsule whereby the latter is to be subject to, and movable in response to changes in, cabin differential pressure; control effecting means including means adapted to be connected to the airflow control means of said system, said control effecting means being operatively connected to said first capsule and motivated by pressure change responsive movements of said capsule to produce operation of said outflow controlling means in a manner which will maintain cabin absolute pressure at a preselected constant value throughout a medium altitude range; means operatively connecting said control effecting means to said second capsule to produce operation of said control effecting means, whenever the difference between cabin absolute pressure and flight absolute pressure reaches a preselected difference, in a manner which will maintain the difference in said pressures substantially constant and equal to said preselected difference as said cabin absolute pressure decreases during ascent of said aircraft higher than said medium altitude; said first and second capsules being so arranged that a preselected expansion of said first capsule will forcibly oppose expansion of said second capsule; means carried by said first capsule and movable therewith as said first capsule expands in response to decreasing cabin absolute pressure as said aircraft ascends beyond said medium altitude range; said last named means, upon attainment by the aircraft of an altitude where the ratio of cabin absolute pressure to flight absolute pressure equals a preselected value, being operative to establish mechanical force-transmitting relationship between said capsules, and co-acting with said first capsule to so modify the pressure change responsive movements of said second capsule as said aircraft ascends beyond said altitude as to thereafter, throughout a higher altitude range, produce such motivation of said control effecting means that the latter is adapted to control operation of said outflow controlling means to vary cabin absolute pressure in accordance with said preselected ratio of cabin absolute pressure to flight absolute pressure.

8. An instrument for use in a system for regulating pressure in an aircraft cabin which system includes means to effect and control air outflow from the cabin, comprising: a first capsule to be mounted within said cabin and including means adapted to be connected to flight absolute pressure and communicating with the interior of said first capsule whereby the latter is to be subject to, and movable in response to changes in, the difference between cabin absolute pressure and flight absolute pressure; a pair of contacts including means adapted to be operatively connected to the outflow effecting and controlling means of said system; a control arm having one end thereof disposed between said contacts for movement into engagement with one or the other of said contacts, depending upon the direction of movement of said arm, to thereby control operation of said outflow controlling means; means operatively connecting said first capsule to said control arm whereby pressure change responsive movement of said first capsule actuates said arm to move the one end thereof into engagement with one or the other of said contacts; a second capsule to be mounted within said cabin and to be subject to cabin absolute pressure and movable in response to changes therein; said capsules being so mounted within said housing as to be in mechanical force transmitting relationship with each other and so arranged that expansion of said second capsule will forcibly oppose expansion of said first capsule, said second capsule acting, whenever the ratio of cabin absolute pressure to flight absolute pressure exceeds a preselected value to resist movement of said control arm resulting from expansion of said first capsule in response to a decrease in the difference between cabin absolute pressure and flight absolute pressure to produce such actuation of said control arm that the latter is adapted to control operation of said outflow control means to vary cabin absolute pressure in accordance with said preselected ratio of cabin absolute pressure to flight absolute pressure.

9. An instrument for use in a system for regulating pressure in an aircraft cabin which system includes means to effect and control air outflow from the cabin, comprising: a housing to be mounted within said cabin and including means for communicating the interior of said housing with the interior of said cabin; a first capsule mounted within said housing; means carried by said housing adapted to be connected to flight absolute pressure and communicating with the interior of said first capsule whereby the latter is to be subject to, and movable in response to changes in, the difference between cabin absolute pressure and flight absolute pressure; a pair of contacts including means adapted to be operatively connected to the outflow effecting and controlling means of said system; means for mounting said contacts within said housing for relative movement therebetween whereby the spacing of said contacts may be selectively varied; a control arm; means for pivotally mounting said control arm within said housing with the one end of said arm disposed between said contacts for movement into engagement with one or the other of said contacts, depending upon the direction of movement of said arm, to thereby control operation of said outflow controlling means; means operatively connecting said first capsule to said control arm whereby pressure change responsive movement of said first capsule is adapted to actuate said arm to move the one end thereof into engagement with one or the other of said contacts; a second capsule mounted within said housing to be subject to cabin absolute pressure and movable in response to changes in cabin absolute pressure, said capsules being so mounted within said housing as to be in mechanical force transmitting relationship with each other and so arranged that expansion of said second capsule will forcibly oppose expansion of said first capsule, said second capsule acting, whenever the ratio of cabin absolute pressure to flight absolute pressure exceeds a preselected value to resist movement of said control arm resulting from expansion of said first capsule in response to a decrease in the difference between cabin absolute pressure and flight absolute pressure to produce such actuation of said control arm that the latter is adapted to control operation of said outflow control means to vary cabin absolute pressure in accordance with said preselected ratio of cabin absolute pressure to flight absolute pressure.

10. An instrument for use in a system for regulating pressure in an aircraft cabin which system includes means to effect and control air outflow from the cabin, comprising: a housing to be mounted within said cabin and including means for communicating the interior of said housing with the interior of said cabin; a frame element removably mounted within said housing; a first capsule mounted on said element; means carried by said housing adapted to be connected to flight absolute pressure and communicating with said first capsule, whereby the latter is to be subject to, and movable in response to changes in, the difference between cabin absolute pressure and flight absolute pressure; a pair of contacts including means adapted to be operatively connected to the outflow effecting and controlling means of said system; means for mounting said contacts on said element; a control arm pivotally mounted on said element with the one end thereof disposed between said contacts for movement into engagement with one or the other of said contacts, depending upon the direction of movement of said arm, to thereby control operation of said outflow controlling means; means operatively connecting said first capsule to said control arm whereby pressure change responsive movement of said first capsule actuates said arm to move the one end thereof into engagement with one or the other of said contacts to maintain the difference between cabin absolute and flight absolute pressure substantially constant; a second capsule mounted on said element to be subject to cabin absolute pressure and movable in response to changes therein, said capsules being so mounted within said housing as to be in mechanical force transmitting relationship with each other and so arranged that expansion of said second capsule will forcibly oppose expansion of said first capsule, said second capsule acting, whenever the ratio of cabin absolute pressure to flight absolute pressure exceeds a preselected value, to resist movement of said control arm resulting from expansion of said first capsule in response to a decrease in the difference between cabin absolute pressure and flight absolute pressure to produce such actuation of said control arm that the latter is adapted to control operation of said outflow controlling means to vary cabin absolute pressure in accordance with said preselected ratio of cabin absolute pressure to flight absolute pressure.

11. An instrument for use in a system for regulating the absolute pressure in an aircraft cabin which system includes means to effect and control air outflow from the cabin, comprising: a first capsule to be mounted within said cabin whereby the latter is subject to, and movable in response to changes in, cabin absolute pressure; a second capsule to be mounted within said cabin; means, including means adapted to be connected to flight absolute pressure, communicating with the interior of said second capsule whereby the latter is to be subject to, and movable in response to changes in, the difference between cabin absolute pressure and flight absolute pressure as said aircraft ascends beyond a selected altitude; means for mounting said capsules in an axially aligned relationship so that expansion of said first capsule in response to a preselected decrease in cabin absolute pressure will forcibly oppose expansion of said second capsule resulting from a decrease in the difference between cabin absolute pressure and flight absolute pressure to modify the pressure change responsive movements of said second capsule to produce a resultant movement as said capsules conjointly move in response to changes in cabin absolute and flight absolute pressures; and control effecting means motivated as a result of and in accordance with the resultant movement of said capsules as the same conjointly move in response to changes in cabin absolute and flight absolute pressures, said control effecting means including means adapted to be operatively connected with the outflow effecting and controlling means of said system whereby the latter is adapted to be operated in accordance with the motivation of said control effecting means.

12. An instrument for use in a system for regulating the absolute pressure in an aircraft cabin which system includes means to effect and control air outflow from the cabin, comprising: a first capsule to be mounted within said cabin whereby the latter is subject to, and movable in response to changes in, cabin absolute pressure; a second capsule to be mounted within said cabin; means, including means adapted to be connected to flight absolute pressure, and communicating with the interior of said second capsule whereby the latter is to be subject to, and movable in response to changes in, the difference between cabin absolute pressure and flight absolute pressure; control effecting means, including means adapted to be operatively connected to the means of said system for effecting and controlling outflow of air from the cabin, for controlling operation of said outflow effecting and controlling means; said capsules being so arranged relative to each other that expansion of said first capsule will forcibly oppose expansion of said second capsule to modify the pressure change responsive movements of said second capsule to produce a resultant movement as said capsules conjointly move in response to changes in cabin absolute and flight absolute pressures; and means motivating said control effecting means in accordance with the resultant movement of said capsules as the same conjointly move in response to changes in cabin absolute and flight absolute pressures, whereby said control effecting means is adapted to control operation of said outflow effecting and controlling means to vary cabin absolute pressure in accordance with a preselected ratio of cabin absolute pressure to flight absolute pressure.

13. An instrument for use in a system for regulating pressure in an aircraft cabin which system includes means to effect and control air outflow from the cabin, comprising: a housing to be mounted within said cabin and including means for communicating the interior of said housing with the interior of said cabin; a first capsule; means for mounting said first capsule within said housing; means carried by said housing adapted to be connected to flight absolute pressure and communicating with said first capsule whereby the latter is to be subject to and movable in response to changes in the difference between cabin absolute pressure and flight absolute pressure; a second capsule; means for mounting said second capsule within said housing whereby said capsule is to be subjected to, and movable in response to changes in, cabin absolute pressure; a control effecting means including means adapted to be operatively connected to the means of the system effecting and controlling outflow of air from the cabin; said capsules being so mounted within said housing as to be in an axially aligned relationship and each movable, during changes in the pressures to which they are subject, in coincident linear paths of movement and so arranged that expansion of said second capsule forcibly opposes expansion of said first capsule as said second capsule expands in response to decreasing cabin absolute pressure during ascent of said aircraft; and means carried by said second capsule and, upon the attainment by said aircraft of an altitude at which the ratio of cabin absolute pressure to flight absolute pressure is substantially equal to a preselected value, coacting with said control effecting means to progressively resist movement of said first capsule in response to a decrease in the difference between cabin absolute pressure and flight absolute pressure to produce such motivation of said control effecting means that the latter is adapted to control operation of said outflow effecting and controlling means of said system to vary cabin absolute pressure in accordance with said preselected ratio of cabin absolute pressure to flight absolute pressure.

14. An instrument for use in a system for regulating pressure in an aircraft cabin which system includes means to effect and control air outflow from the cabin, comprising: a housing to be mounted within said cabin and including means for communicating the interior of said housing with the interior of said cabin; a first capsule mounted within said housing; means carried by said housing adapted to be connected to flight absolute pressure and communicating with said first capsule whereby the latter is to be subject to, and movable in response to changes in, the difference between cabin absolute pressure and flight absolute pressure; a second capsule mounted within said housing to be subjected to, and movable in response to changes in, cabin absolute pressure; a control effecting means including means adapted to be operatively connected to the means of the system effecting and controlling outflow of air from the cabin; means operatively connecting the first capsule to said control effecting means whereby the latter is motivated by pressure change responsive movements of said first capsule, independently of said second capsule so long as the ratio of cabin absolute pressure to flight absolute pressure is less than a preselected value, to maintain a preselected maximum differential of cabin absolute pressure over flight absolute pressure, said capsules being so arranged that a preselected expansion of said second capsule will forcibly oppose expansion of said first capsule; and means carried by said second capsule and, upon the attainment by said aircraft of an altitude at which the ratio of cabin absolute pressure to flight absolute pressure is substantially equal to a preselected value, operatively connected with said control effecting means to establish mechanical force-transmitting relationship between said capsules and coacting with said second capsule to progressively resist the moving force of said first capsule in response to a decrease in the difference between cabin absolute pressure and flight absolute pressure to produce such motivation of said control effecting means that the latter is adapted to control operation of said outflow effecting and controlling means of said system to vary cabin absolute pressure in accordance with said preselected ratio of cabin absolute pressure to flight absolute pressure.

15. An instrument for use in a system for regulating pressure in an aircraft cabin which system includes means to effect and control air outflow from the cabin, comprising: control effecting means, including means adapted to be operatively connected to the means of the system effecting and controlling air outflow from the cabin; a first capsule to be subjected to, and movable in response to changes in, cabin absolute pressure; means operatively interconnecting said first capsule and said control effecting means whereby the latter is motivated by pressure change responsive movements of said capsule to control operation of said outflow effecting and controlling means to vary cabin absolute pressure; a second capsule to be subjected to, and movable in response to changes in, the difference between cabin absolute pressure and flight absolute pressure; means operatively interconnecting said second capsule and said control effecting means whereby said second capsule is operable, upon the attainment of a preselected difference of cabin absolute pressure over flight absolute pressure, to override the action of said first capsule on said control effecting means to thereafter actuate said control effecting means to control operation of said outflow effecting and controlling means to so vary the rate of discharge of air from the cabin to maintain the difference between cabin absolute pressure and flight absolute pressure equal to said preselected difference, said capsules being so mounted within said housing as to be in mechanical force transmitting relationship with each other and so arranged that expansion of said first capsule forcibly opposes expansion of said second capsule as said first capsule expands in response to decreasing cabin absolute pressure during ascent of said aircraft; and means operatively associated with said first capsule and operable at a preselected cabin absolute pressure to coact with said second capsule to so motivate said control effecting means as to adapt the latter to control operation of said outflow effecting and controlling means to decrease cabin differential pressure at such a rate as flight absolute pressure decreases to maintain cabin absolute pressure in accordance with a preselected ratio of cabin absolute pressure to flight absolute pressure.

16. An instrument for use in a system for regulating pressure in an aircraft cabin which system includes means to effect and control air outflow from the cabin, comprising: a housing to be mounted within said cabin and including means for communicating the interior of said housing with the interior of said cabin; a first capsule mounted within said housing adapted to be subject to cabin absolute pressure; a pair of contacts including means adapted to be operatively connected to the outflow effecting and controlling means of said system; a control arm pivotally mounted within said housing with the one end thereof disposed between said contacts for movement into engagement with one or the other of said contacts, depending upon the direction of movement of said arm to thereby control operation of said outflow controlling means; means operatively connecting said first capsule to said control arm whereby pressure change responsive movements of said first capsule so actuates said arm that the latter, coacting with said contacts, is adapted to so control operation of said outflow controlling means as to maintain cabin absolute pressure substantially constant throughout a medium altitude range of the aircraft; a second capsule mounted with said housing; means carried by said housing adapted to be connected to flight absolute pressure and communicating with said second capsule whereby the latter is to be subject to, and movable in response to changes in, the difference between cabin absolute pressure and flight absolute pressure; a second pair of contacts including means adapted to be operatively connected to the outflow effecting and controlling means of said system; a second control arm pivotally mounted within said housing with one end thereof disposed between said second pair of contacts for movement into engagement with one or the other of said contacts; means operatively interconnecting said first control arm and a selected one of said second pair of contacts and coacting with said second control arm to maintain said first control arm operative to effect actuation of said outflow controlling means so long as said second control arm is engaging said preselected contact; means operatively connecting said second capsule to said second control arm whereby pressure change responsive movements of said second capsule so actuate said second control arm that the latter, coacting with said second pair of contacts, is adapted to so control operation of said outflow controlling means as to maintain the difference between cabin absolute pressure and flight absolute pressure at a substantially constant value throughout a higher altitude range of the aircraft, said second capsule moving said second control arm of engagement with said preselected contact as the difference between cabin absolute pressure and flight absolute pressure reaches said predetermined value, thereby to render said first control arm inoperative to effect actuation of said outflow controlling means; said capsules being so mounted within said housing as to be in mechanical force transmitting relationship with each other and so arranged that expansion of said first capsule will forcibly oppose expansion of said second capsule; said first capsule acting, whenever the ratio of cabin absolute pressure to flight absolute pressure exceeds a preselected value, to resist movement of said second control arm resulting from expansion of said second capsule in response to a decrease in the difference between cabin absolute pressure and flight absolute pressure to produce such actuation of said second control arm that the latter is adapted to control operation of said outflow control means throughout the highest altitude range of the aircraft to vary cabin absolute pressure in accordance with said preselected ratio of cabin absolute pressure to flight absolute pressure.

17. An instrument for use in a system for regulating the absolute pressure in an aircraft cabin, which system includes means to effect and control air outflow from the cabin, comprising: a housing to be mounted within said cabin and including means for communicating the interior of said housing with the interior of said cabin; a first capsule mounted within said housing; means carried by said housing adapted to be connected to flight absolute pressure and communicating with the interior of said first capsule whereby the latter is to be subjected to and movable in response to changes in the difference between the pressure within said housing and flight absolute pressure; a second capsule mounted within said housing exteriorly subjected to housing pressure and movable in response to changes in housing pressure, said capsules being mounted in and axially aligned relationship so that expansion of said second capsule in response to a preselected decrease in housing pressure will forcibly oppose expansion of said first capsule resulting from a decrease in the difference between housing pressure and flight absolute pressure to modify the pressure change responsive movements of said first capsule to produce a resultant movement as said capsules conjointly move in response to changes in housing and flight absolute pressures; and control effecting means motivated as a result of and in accordance with the resultant movement of said capsules as the same conjointly move in response to changes in housing pressure and flight absolute pressures, said control effecting means including means adapted to be operatively connected with the outflow effecting and controlling means of said system whereby the latter is adapted to be operated in accordance with the motivation of said control effecting means.

BRUCE E. DEL MAR.

REFERENCES CITED

The following references are of record in the file of this patent:

UNITED STATES PATENTS

| Number | Name | Date |
|---|---|---|
| 2,208,554 | Price | July 16, 1940 |
| 2,396,116 | Noxon | Mar. 5, 1946 |
| 2,450,076 | Bechberger | Sept. 28, 1949 |
| 2,463,487 | Widgery et al. | Mar. 1, 1949 |
| 2,549,672 | Del Mar | Apr. 17, 1951 |
| 2,549,673 | Del Mar | Apr. 17, 1951 |
| 2,549,690 | Klemperer | Apr. 17, 1951 |